(12) United States Patent
Nakada et al.

(10) Patent No.: US 10,435,071 B2
(45) Date of Patent: *Oct. 8, 2019

(54) STEERING ASSIST DEVICE AND CIRCUIT (71) Applicant: Honda Motor Co., Ltd., Tokyo (JP)

(72) Inventors: Yuki Nakada, Wako (JP); Hiroyuki Koibuchi, Wako (JP); Daisuke Kondo, Wako (JP); Yosuke Sakamoto, Wako (JP); Yoshifumi Banno, Wako (JP); Yuki Kizumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 223 days.

This patent is subject to a terminal disclaimer.

(21) Appl. No.: 15/437,616

(22) Filed: Feb. 21, 2017

(65) Prior Publication Data

US 2017/0240205 A1 Aug. 24, 2017

(30) Foreign Application Priority Data

Feb. 22, 2016 (JP) .................. 2016-030970

(51) Int. Cl.
*B62D 3/04* (2006.01)
*B62D 5/04* (2006.01)
*B62D 6/04* (2006.01)
*B62D 6/10* (2006.01)
*B62D 15/02* (2006.01)

(52) U.S. Cl.
CPC ............ *B62D 15/025* (2013.01); *B62D 3/04* (2013.01); *B62D 5/0463* (2013.01); *B62D 6/04* (2013.01); *B62D 6/10* (2013.01); *B62D 15/021* (2013.01)

(58) Field of Classification Search
CPC .......... B62D 3/04; B62D 5/0463; B62D 6/04; B62D 6/10; B62D 15/021; B62D 15/025; B60W 10/20; B60W 30/045; B60W 30/18145; B60W 40/072; B60W 2550/146
See application file for complete search history.

(56) References Cited

U.S. PATENT DOCUMENTS

| 7,360,614 | B2 * | 4/2008 | Yokote | ............... B60L 15/2036 180/446 |
| 9,139,173 | B2 * | 9/2015 | Yasui | ........................ B60T 7/12 |
| 10,124,825 | B2 * | 11/2018 | Wada | .................. B62D 5/0463 |
| 2004/0238238 | A1 * | 12/2004 | Yokote | ............... B60L 15/2036 180/6.2 |
| 2011/0178689 | A1 * | 7/2011 | Yasui | ........................ B60T 7/12 701/70 |
| 2016/0229447 | A1 * | 8/2016 | Wada | .................. B62D 5/0463 |

FOREIGN PATENT DOCUMENTS

JP 2011-207242 A 10/2011

* cited by examiner

*Primary Examiner* — Jerrah Edwards
(74) *Attorney, Agent, or Firm* — Westerman, Hattori, Daniels & Adrian, LLP (57) ABSTRACT

If road information indicates that a first curve zone at a near side and a second curve zone at a far side that curve in different directions are continuously located in a road, a steering assist unit of a steering assist device or a steering assist circuit finishes decreasing process of decreasing the steering assist amount when the subject vehicle passes through the first curve zone earlier than a case when the subject vehicle passes through the second curve zone.

10 Claims, 8 Drawing Sheets

STEERING ASSIST DEVICE AND CIRCUIT

CROSS REFERENCES TO RELATED APPLICATIONS

The present application claims priority under 35 U.S.C. § 119 to Japanese Patent Application No. 2016-030970, filed Feb. 22, 2016, entitled "Steering Assist Device and Circuit." The contents of this application are incorporated herein by reference in their entirety.

TECHNICAL FIELD

The present disclosure relates to a steering assist device and circuit that assists a vehicle in steering in curve zones by using steering assist torque.

BACKGROUND

Japanese Unexamined Patent Application Publication No. 2011-207242 describes a vehicle drive control system that can control the drive state in a road including multiple curve zones by reflecting the feeling of a driver ([0005], Abstract).

This vehicle drive control system (Abstract) includes a drive state changing unit and a control device. The drive state changing unit changes the drive state of a vehicle. The control device controls the drive state changing unit in accordance with the corner. Regarding a road including a straight zone and two curve zones connected by the straight zone ahead of a vehicle, the control device determines in step S5, based on the driving record of a driver, whether the behavior of the vehicle will be likely to be stabilized while the driver is driving in the straight zone from one curve zone to the other curve zone. If the behavior of the vehicle is likely to be stabilized (YES in step S5), the control device controls the drive state changing unit by regarding the two curve zones as independent corners (steps S6 to S9). If the behavior of the vehicle is not likely to be stabilized (NO in step S5), the control device controls the drive state changing unit by regarding the two curve zones and the straight zone as one corner (steps S10 and S11).

Examples of the drive state changing unit are a braking force changing unit (braking device 18), an automatic transmission 13, an active suspension 31, and an acceleration changing unit (such as an engine 11) (claim 4, [0009], [0057]).

SUMMARY

As described above, in the above-described vehicle drive control system, if it is determined based on the driving record of a driver that the behavior of the vehicle will not be likely to be stabilized while the driver is driving in the straight zone (NO in step S5), the control device controls the drive state changing unit by regarding the two curve zones and the straight zone as one corner (steps S10 and S11). Examples of the drive state changing unit are a braking force changing unit (braking device), an automatic transmission, an active suspension, and an acceleration changing unit (such as an engine 11) (claim 4, [0009], [0057]).

The above-described publication does not disclose steering assist in continuous first and second curve zones (including curve zones with an intervening straight zone).

The present application describes, for example, a steering assist device and circuit that can be suitably used in continuous first and second curve zones that curve in different directions.

A steering assist device according to one aspect of the present disclosure includes an environment information obtaining unit and a steering assist unit. The environment information obtaining unit obtains environment information concerning environments in a traveling direction of a subject vehicle. The steering assist unit assists the subject vehicle in steering, based on the environment information obtained by the environment information obtaining unit. The environment information obtaining unit includes a road information obtaining unit that obtains road information concerning a position and a configuration of a road in which the subject vehicle travels. If the road information indicates that a first curve zone at a near side and a second curve zone at a far side that curve in different directions are continuously located in the road, the steering assist unit finishes decreasing process of decreasing the steering assist amount when the subject vehicle passes through the first curve zone earlier than a case when the subject vehicle passes through the second curve zone.

If first and second curve zones that curve in different directions are continuously located in the road, the decreasing process of decreasing the steering assist amount when the subject vehicle passes through the first curve zone is finished earlier than a case when the subject vehicle passes through the second curve zone. With this configuration, the steering assist amount for the second curve zone can reliably be generated when the subject vehicle reaches the second curve zone. Hence, steering assist can suitably be performed in the continuous first and second curve zones that curve in different directions.

If the first and second curve zones are continuously located in the road, the steering assist unit may increase the steering assist amount as a lateral acceleration of the subject vehicle increases, regardless of whether the first and second curve zones curve in the same direction or different directions.

If the continuous first and second curve zones curve in the same direction, the lateral acceleration changes in the same direction both in the first and second curve zones. If the continuous first and second curve zones curve in different directions, the direction in which the lateral acceleration changes in the first curve zone is opposite to that in the second curve zone. By setting the steering assist amount in accordance with the lateral acceleration, steering assist can be performed by using the same basic control, regardless of whether the continuous first and second curve zones curve in the same direction or different directions.

The lateral acceleration is generated independently of the steering force of a driver. When the driver decreases the steering force while driving in a curve zone, self-aligning torque may be generated in the wheels. Even in this case, the steering assist amount is set in accordance with the lateral acceleration. This makes it more likely to maintain the steering state when the driver decreases the steering force, thereby enhancing the driving stability.

If the road information indicates that the first and second curve zones are continuously located in the road and that the first and second curve zones curve in different directions, the steering assist unit may decrease the steering assist amount to zero when the subject vehicle is positioned in an area before an end point of the first curve zone even if the lateral acceleration is generated. This makes it possible to perform steering assist by taking the second curve zone into account while maintaining basic control in which the steering assist amount is set in accordance with the lateral acceleration.

If the road information indicates that a straight zone is located between the first and second curve zones, the steering assist unit may determine that the first and second curve zones are continuous if a time or distance first allowance degree is smaller than a first allowance degree threshold. The time or distance first allowance degree represents an allowance in terms of a time or a distance from a first reference position of the first curve zone or the subject vehicle to a second reference position of the second curve zone. Even with the presence of a straight zone between the first and second curve zones, it is possible to adjust the steering assist amount in the first curve zone by taking the second curve zone into account.

As a time or distance second allowance degree is greater, the steering assist unit may reduce a decrease in the steering assist amount per unit time to be smaller. The time or distance second allowance degree represents an allowance in terms of a time or a distance from a third reference position of the first curve zone or the subject vehicle to a fourth reference position of the second curve zone. If the time or distance second allowance degree for the second curve zone is relatively high, the steering assist amount in the first curve zone is decreased moderately. This makes it more likely to improve the steering assist performance in the first curve zone while suitably performing steering assist in the second curve zone.

If the road information indicates that the first and second curve zones are continuously located in the road and that the first and second curve zones curve in different directions, the steering assist unit may reduce a decrease in the steering assist amount per unit time to be smaller when a curvature degree of the first curve zone is greater than a curvature degree of the second curve zone than when the curvature degree of the second curve zone is greater than the curvature degree of the first curve zone.

This arrangement makes it possible to enhance the driving stability in the first curve zone which curves more sharply than the second curve zone. "A curvature degree of the first curve zone is greater than a curvature degree of the second curve zone" means that the radius of curvature of the first curve zone is smaller than that of the second curve zone or that the curvature of the first curve zone is greater than that of the second curve zone.

A steering assist circuit according to an aspect of the present disclosure assists a subject vehicle in steering, based on road information concerning a position and a configuration of a road in which the subject vehicle travels. The steering assist circuit increases or decreases a steering assist amount in accordance with an increase or a decrease in a lateral acceleration of the subject vehicle. If the road information indicates that a first curve zone at a near side and a second curve zone at a far side that curve in different directions are continuously located in the road, the steering assist circuit decreases the steering assist amount when the subject vehicle is positioned in an area before an end point of the first curve zone regardless of a degree of a decrease in the lateral acceleration, or the steering assist circuit increases a degree of a decrease in the steering assist amount in relation to the degree of a decrease in the lateral acceleration to be greater when the subject vehicle is positioned in the area before the end point of the first curve zone than when the subject vehicle is positioned in an area before an end point of the second curve zone.

With this configuration, the steering assist amount for the second curve zone can reliably be generated when the subject vehicle reaches the second curve zone. As a result, steering assist can suitably be performed in the continuous first and second curve zones that curve in different directions.

BRIEF DESCRIPTION OF THE DRAWINGS

The advantages of the disclosure will become apparent in the following description taken in conjunction with the following drawings.

DETAILED DESCRIPTION

A. Embodiment
A-1. Description of Overall Configuration
[A-1-1. Overall Configuration of Vehicle 10]

Figure 1:
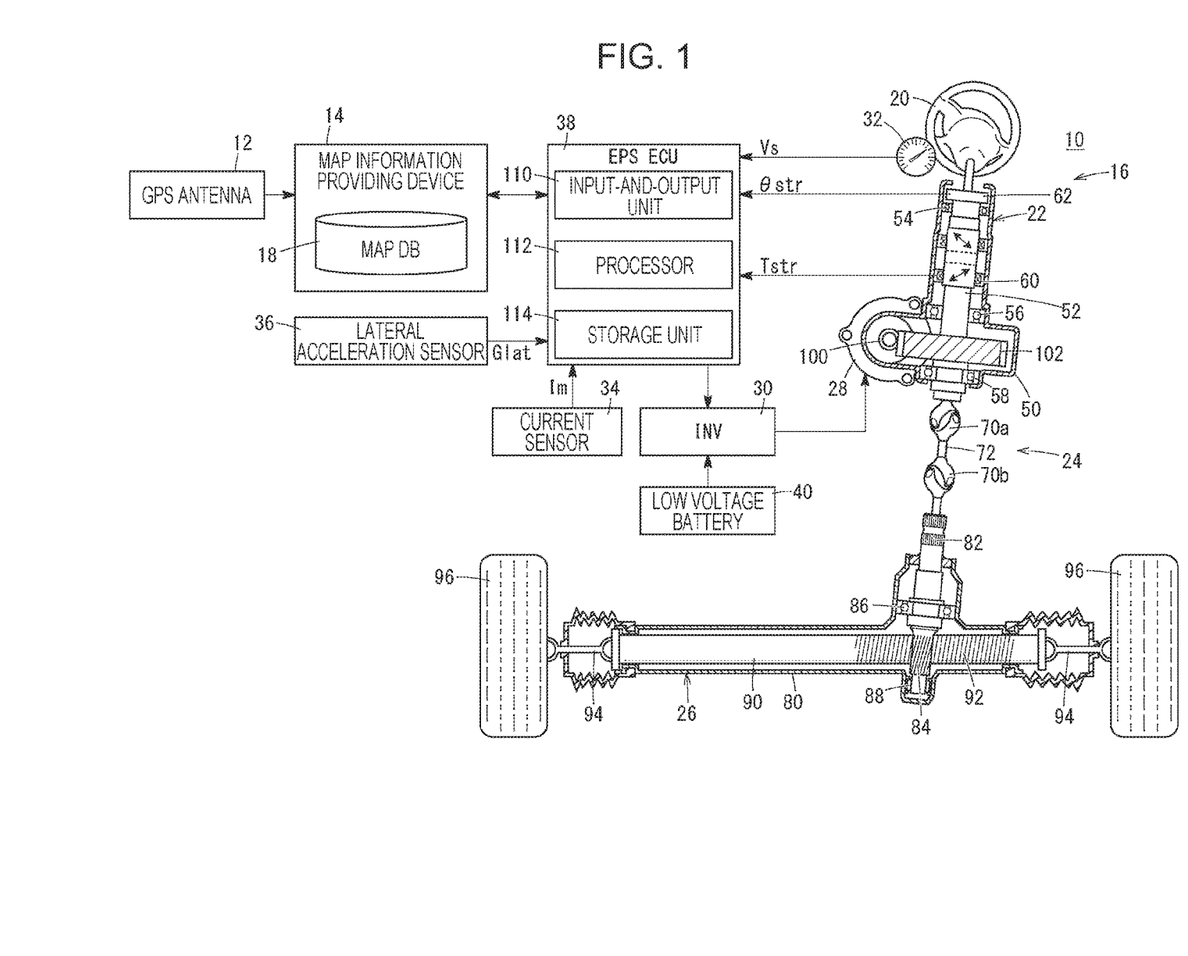
FIG. 1 is a schematic view of a vehicle including an electric power steering (EPS) device which serves as a steering assist device according to an embodiment.

FIG. 1 is a schematic view of a vehicle 10 including an electric power steering device 16 (hereinafter called "EPS device 16") which serves as a steering assist device according to an embodiment. As shown in FIG. 1, the vehicle 10 also includes a global positioning system (GPS) antenna 12 and a map information providing device 14. The vehicle 10 may also include other components such as a front camera (not shown), which will be discussed later.

[A-1-2. GPS Antenna 12]

The GPS antenna 12 receives signals from multiple GPS satellites above the vehicle 10 (GPS signals), and outputs the GPS signals to the map information providing device 14.

[A-1-3. Map Information Providing Device 14]

The map information providing device 14 (environment information obtaining unit) specifies the current position Pc of the vehicle 10 based on the GPS signals from the GPS antenna 12, and also provides the current position Pc and information concerning an area around the current position Pc (hereinafter also called "map information Imap") to the EPS device 16. The map information Imap includes curve zone information Icy concerning curve zones. The curve zone information Icy indicates the radius R of a curve zone (hereinafter also called "curve radius R"), the distance to the start point of a curve zone (hereinafter also called "start point distance Lin"), and the distance to the end point of a curve zone (hereinafter also called "end point distance Lout").

The map information Imap (environment information) is stored in a map database 18 (hereinafter called "map DB 18") of the map information providing device 14. The map information providing device 14 specifies the current position Pc of the vehicle 10 based on the GPS signals received by the GPS antenna 12. The map information providing device 14 reads the map information Imap from the map DB 18 (road information obtaining unit) based on the current position Pc, and provides the map information Imap to the EPS device 16, together with the current position Pc.

[A-1-4. EPS Device 16]
(A-1-4-1. Overview of EPS Device 16)

The EPS device 16 includes a steering wheel 20, a steering column 22, an intermediate joint 24, a steering gear box 26, a drive motor 28 for the EPS device 16 (hereinafter also called "EPS motor 28"), an inverter 30 (hereinafter also called "EPS inverter 30"), a vehicle velocity sensor 32, a current sensor 34, a lateral acceleration sensor 36, an EPS electronic control unit (hereinafter called "EPS ECU 38" or "ECU 38"), and a low voltage battery 40 (hereinafter also called "battery 40").

The steering column 22 includes a housing 50, a steering shaft 52 supported by bearings 54, 56, and 58 within the housing 50, a torque sensor 60, and a steering angle sensor 62.

The intermediate joint 24 includes two universal joints 70a and 70b and a shaft 72 disposed therebetween.

The steering gear box 26 includes a housing 80, a pinion shaft 82, a rack shaft 90, and tie rods 94. The pinion shaft 82 is provided with a pinion 84 of a rack-and-pinion mechanism and is supported by bearings 86 and 88. The rack shaft 90 is provided with rack teeth 92 of the rack-and-pinion mechanism.

(A-1-4-2. Manual Steering System)

One end of the steering shaft 52 is fixed to the steering wheel 20, and the other end thereof is interconnected to the universal joint 70a. The universal joint 70a interconnects the other end of the steering shaft 52 and one end of the shaft 72. The universal joint 70b interconnects the other end of the shaft 72 and one end of the pinion shaft 82. The pinion 84 of the pinion shaft 82 meshes with the rack teeth 92 of the rack shaft 90 which can reciprocate in the width direction of the vehicle 10. Ends of the rack shaft 90 are interconnected to right and left front wheels 96 via the tie rods 94.

As a result of a driver operating the steering wheel 20, steering torque Tstr (rotational force) is generated and is transmitted to the pinion shaft 82 via the steering shaft 52 and the intermediate joint 24. Then, as a result of the pinion 84 of the pinion shaft 82 meshing with the rack teeth 92 of the rack shaft 90, the steering torque Tstr is converted into thrust, thereby displacing the rack shaft 90 in the width direction of the vehicle 10. In accordance with the displacement of the rack shaft 90, the tie rods 94 rotate the front wheels 96 to change the direction of the vehicle 10.

The steering shaft 52, the intermediate joint 24, the pinion shaft 82, the rack shaft 90, and the tie rods 94 form a manual steering system that directly transmits thrust converted from the steering torque Tstr generated as a result of the driver operating the steering wheel 20 to the front wheels 96.

(A-1-4-3. Steering Assist System)
(A-1-4-3-1. Assist Drive System)

The EPS motor 28 is interconnected to the steering shaft 52 via a worm gear 100 and a worm wheel gear 102. That is, the output shaft of the EPS motor 28 is interconnected to the worm gear 100. The worm wheel gear 102 which meshes with the worm gear 100 is integrally or elastically formed in the steering shaft 52.

In this embodiment, the EPS motor 28 is a three-phase alternating current (AC) brushless motor. The EPS motor 28 may be another type of motor, such as a three-phase AC brush, single-phase AC, or direct current (DC) motor. The EPS motor 28 receives power from the low voltage battery 40 via the EPS inverter 30 which is controlled by the EPS ECU 38, and generates drive torque Tm (hereinafter also called "motor torque Tm" or "torque Tm") in accordance with the magnitude of power. The motor torque Tm (or thrust based on the motor torque Tm) is transmitted to the rack shaft 90 via the output shaft of the EPS motor 28, the worm gear 100, the steering shaft 52 (worm wheel gear 102), the intermediate joint 24, and the pinion shaft 82. The EPS motor 28, the worm gear 100, and the steering shaft 52 (worm wheel gear 102) form an assist drive system that generates a steering drive force (motor torque Tm).

In this embodiment, the torque Tm is used as steering assist torque Tasi. The steering assist torque Tasi includes base assist torque Tb and rotation assist torque Tra. The base assist torque Tb is a drive force acting in the same direction as the input torque (steering torque Tstr) applied to the steering wheel 20 by the driver so as to assist the driver in steering. The rotation assist torque Tra is torque for assisting the vehicle 10 in turning in a curve zone. The steering assist torque Tasi may act in a direction opposite to the steering torque Tstr, which will be discussed later.

(A-1-4-3-2. Assist Control System)

The EPS inverter 30, the vehicle velocity sensor 32, the current sensor 34, the lateral acceleration sensor 36, the EPS ECU 38, the torque sensor 60, and the steering angle sensor 62 form an assist control system that controls the assist drive system. Hereinafter, the assist drive system, the assist control system, and the low voltage battery 40 may collectively be called a steering assist system. In this embodiment, output from the EPS motor 28 is controlled under vector control using the d axis and the q axis.

(a) Feedforward Sensors

The torque sensor 60 detects the steering torque Tstr applied to the steering shaft 52 and outputs the steering torque Tstr to the EPS ECU 38. The vehicle velocity sensor 32 detects the vehicle velocity Vs [km/h] and outputs the vehicle velocity to the EPS ECU 38. The lateral acceleration sensor 36 detects the lateral acceleration Glat generated in the vehicle 10 and outputs the lateral acceleration Glat to the EPS ECU 38. The steering angle sensor 62 detects the steering angle θstr (steering angle value θstr) [degrees] indicating the steering amount of the steering wheel 20 and outputs the steering angle θstr to the EPS ECU 38. The steering torque Tstr, the vehicle velocity Vs, the lateral acceleration Glat, and the steering angle θstr are used for feedforward control performed by the EPS ECU 38.

(b) EPS Inverter 30

The EPS inverter 30 is a three-phase bridge inverter that performs DC-AC conversion. The EPS inverter 30 converts a DC from the low voltage battery 40 into a three-phase AC and supplies it to the EPS motor 28.

(c) Feedback Sensors

The current sensor 34 detects a q-axis current (hereinafter called "motor current Im"), which is a torque current component in the above-described vector control. In this embodiment, when the EPS motor 28 is driven in a first direction (which causes the vehicle 10 to turn in the right direction, for example), the motor current Im is set to be a positive value. When the EPS motor 28 is driven in a second direction (which causes the vehicle 10 to turn in the left direction, for example), the motor current Im is set to be a negative value. However, if it is possible to determine the first direction and the second direction, the motor current Im may take only positive values.

The current sensor 34 includes a current sensor unit (not shown), a resolver (not shown), and a q-axis current calculator. The current sensor unit detects currents of at least two of the U-, V-, and W-phase windings (not shown) of the EPS motor 28. The resolver detects the electrical angle θ, which is the rotating angle of the output shaft (not shown) or an outer rotor of the EPS motor 28. The q-axis current calculator calculates the q-axis current (motor current Im), based on the currents of at least two of the U-, V-, W-phase windings detected by the current sensor unit and the electrical angle θ detected by the resolver. The function of the q-axis current calculator may be implemented by the EPS ECU 38.

(d) EPS ECU 38

As shown in FIG. 1, the EPS ECU 38 (steering assist unit, steering assist circuit) includes an input-and-output unit 110, a processor 112, and a storage unit 114 as the hardware configuration. The input-and-output unit 110 performs input and output between the ECU 38 and an external device (such as the map information providing device 14). The processor 112 includes a central processing unit (CPU), and controls the EPS device 16 by using programs and data stored in the storage unit 114. For example, the ECU 38 controls output from the EPS motor 28 by using the EPS inverter 30, based on the output values from the individual sensors. The storage unit 114 includes a volatile memory and a non-volatile memory, and stores various programs and data used by the processor 112. Details of the ECU 38 will be discussed later with reference to FIG. 2.

(A-1-4-3-3. Low Voltage Battery 40)

The low voltage battery 40 is an energy storage device that is capable of outputting a low voltage (12 V in this embodiment), and may be a secondary cell such as a lead-acid battery.

A-2. Steering Assist Control

[A-2-1. Overview of Steering Assist Control]

Steering assist control performed by the EPS ECU 38 in this embodiment will be described below.

(A-2-1-1. Functional Configuration of Processor 112)

(A-2-1-1-1. Overview)

Figure 2:
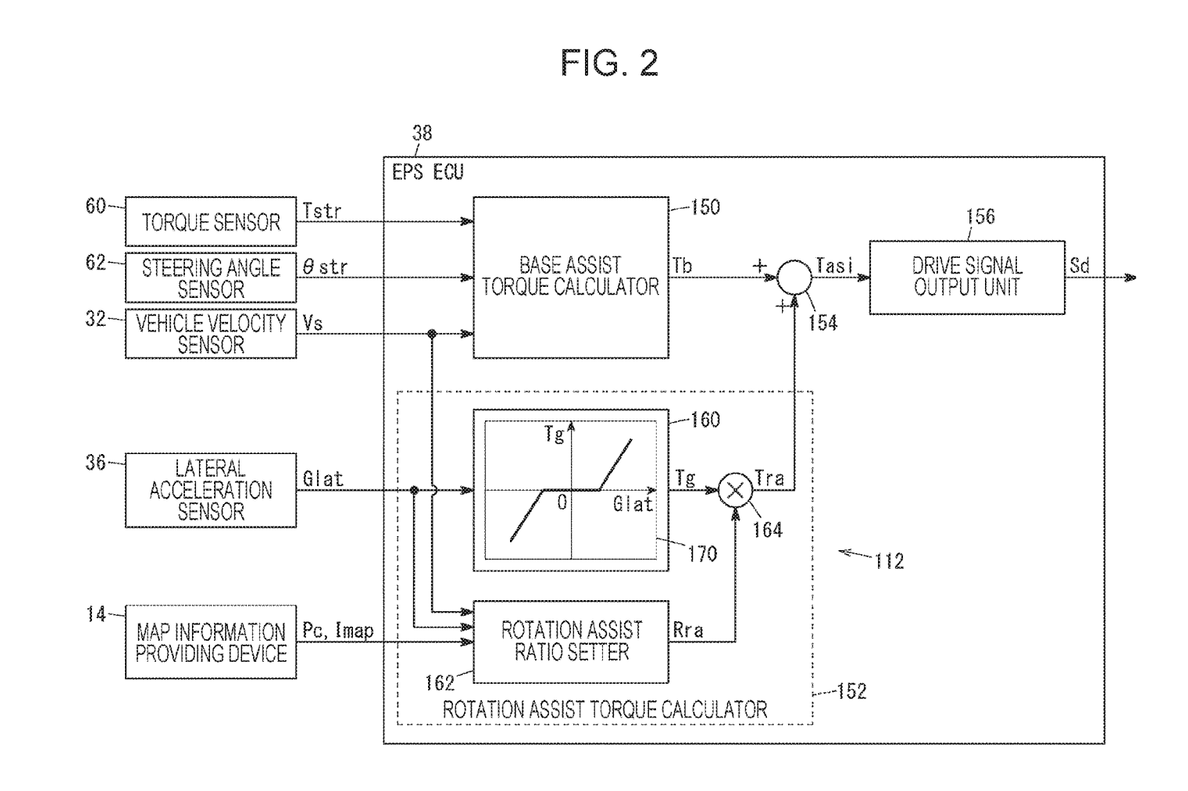
FIG. 2 is a block diagram illustrating the functional configuration of a processor of an EPS electronic control unit in the embodiment.

FIG. 2 illustrates the functional configuration of the processor 112 of the EPS ECU 38. As shown in FIG. 2, the processor 112 includes a base assist torque calculator 150, a rotation assist torque calculator 152, an adder 154, and a drive signal output unit 156. The processor 112 implements these elements as a result of executing a program stored in the storage unit 114. However, some or all functions of these elements may be implemented by hardware (such as an electric circuit).

(A-2-1-1-2. Base Assist Torque Calculator 150)

The base assist torque calculator 150 (hereinafter also called "calculator 150") calculates the base assist torque Tb, based on the steering torque Tstr from the torque sensor 60, the steering angle θstr from the steering angle sensor 62, and the vehicle velocity Vs from the vehicle velocity sensor 32. In this embodiment, a map in which the base assist torque Tb is associated with a combination of the steering torque Tstr, the steering angle velocity Vstr, and the vehicle velocity Vs is stored in the storage unit 114. The calculator 150 first calculates the steering angle velocity Vstr [deg/s] based on the steering angle θstr [deg], and then specifies the base assist torque Tb in association with a combination of the steering torque Tstr, the steering angle velocity Vstr, and the vehicle velocity Vs.

(A-2-1-1-3. Rotation Assist Torque Calculator 152)

The rotation assist torque calculator 152 (hereinafter also called "calculator 152") calculates the rotation assist torque Tra (steering assist amount), based on the lateral acceleration Glat from the lateral acceleration sensor 36, the current position Pc and the map information Imap from the map information providing device 14, and the vehicle velocity Vs from the vehicle velocity sensor 32. As shown in FIG. 2, the calculator 152 includes a lateral-acceleration torque calculator 160, a rotation assist ratio setter 162, and a multiplier 164.

The lateral-acceleration torque calculator 160 (hereinafter also called "calculator 160") calculates the lateral acceleration torque Tg corresponding to the lateral acceleration Glat from the lateral acceleration sensor 36. In this embodiment, a map 170 in which the lateral acceleration Glat and the lateral acceleration torque Tg are associated with each other is stored in the storage unit 114.

The map 170 indicates that, as the absolute value of the lateral acceleration Glat increases, the absolute value of the lateral acceleration torque Tg also increases, except in a dead zone around the origin. Alternatively, as long as the absolute value of the lateral acceleration torque Tg partially increases in proportion to an increase in the absolute value of the lateral acceleration Glat, the lateral acceleration Glat and the lateral acceleration torque Tg may be associated with each other in a different manner. For example, the map 170 without a dead zone may be used.

The rotation assist ratio setter 162 (hereinafter also called "setter 162") calculates the rotation assist ratio Rra (hereinafter also called "ratio Rra"), based on the current position Pc and the map information Imap from the map information providing device 14. The ratio Rr is a variable by which the lateral acceleration torque Tg is multiplied. The ratio Rra can take 0 to 1 in this embodiment. Calculation of the ratio Rra will be discussed later with reference to FIGS. 3 through 8.

The multiplier 164 multiplies the lateral acceleration torque Tg from the calculator 160 by the ratio Rra from the setter 162, and outputs the resulting value to the adder 154 as the rotation assist torque Tra.

(A-2-1-1-4. Adder 154)

The adder 154 adds the base assist torque Tb from the base assist torque calculator 150 and the rotation assist torque Tra from the rotation assist torque calculator 152 so as to calculate the steering assist torque Tasi (target value).

(A-2-1-1-5. Drive Signal Output Unit 156)

The drive signal output unit 156 (hereinafter also called "output unit 156") calculates the target motor current Imtar corresponding to the steering assist torque Tasi. The output unit 156 then outputs a drive signal Sd to the switching elements of the inverter 30 so that the motor current Im from the current sensor 34 will coincide with the target motor current Imtar.

[A-2-2. Calculation of Rotation Assist Ratio Rra]

(A-2-2-1. Overview of Calculation of Rotation Assist Ratio Rra)

Figure 3:
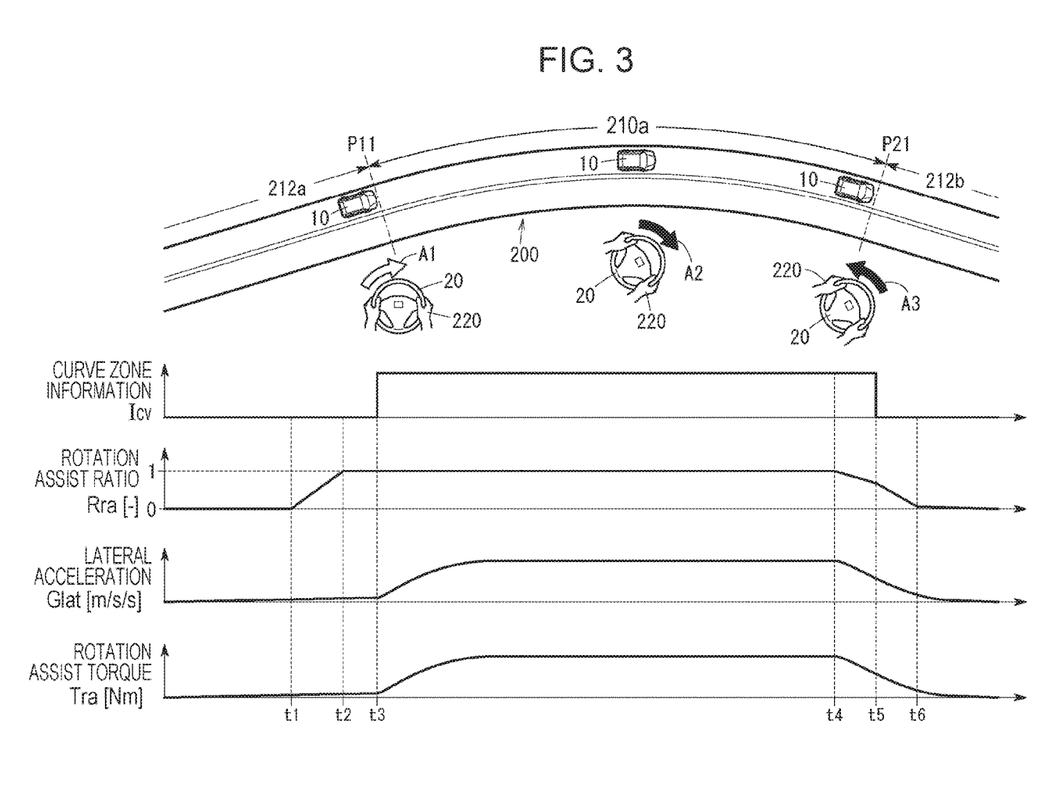
FIG. 3 illustrates an example of various items of information and data to be used when the vehicle drives in a single curve zone in the embodiment.
Figure 4:
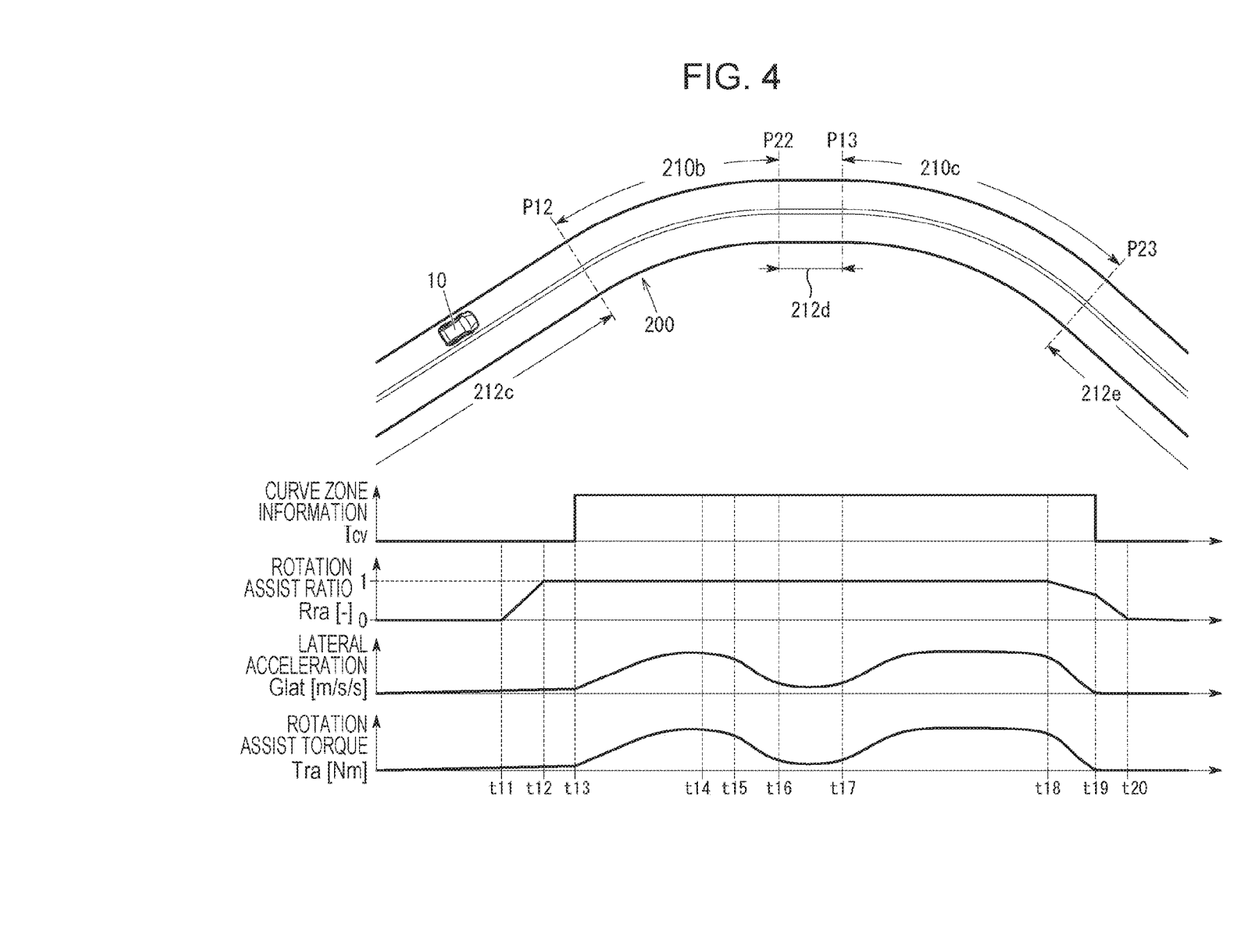
FIG. 4 illustrates an example of various items of information and data to be used when the vehicle drives in first and second curve zones that curve in the same direction in the embodiment.
Figure 5:
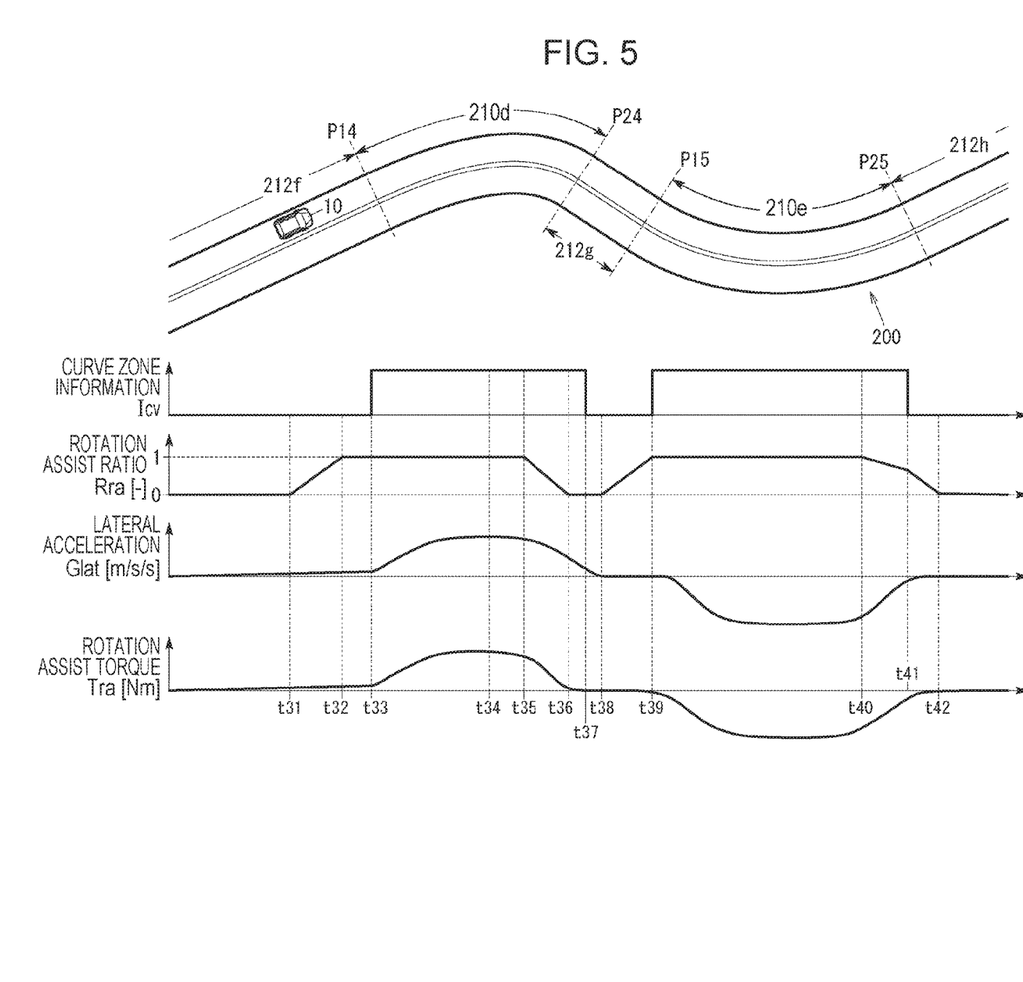
FIG. 5 illustrates an example of various items of information and data to be used when the vehicle drives in first and second curve zones that curve in different directions in the embodiment.

An overview of calculation of the rotation assist ratio Rra will be discussed below by taking three examples in which curve zones 210a through 210e are present in a road 200 in which the vehicle 10 is driving (FIGS. 3 through 5). Hereinafter, the curve zones 210a through 210e will collectively be called the curve zone 210 unless it is necessary to distinguish them from each other. Straight zones 212a through 212h are present before or after the curve zones 210. Hereinafter, the straight zones 212a through 212h will collectively be called the straight zone 212 unless it is necessary to distinguish them from each other.

(A-2-2-1-1. Driving in Single Curve Zone 210a)

FIG. 3 illustrates an example of various items of information and data to be used in this embodiment when the vehicle 10 drives in the single curve zone 210a. A point P11 is the start point of the curve zone 210a and a point P21 is the end point of the curve zone 210a. Hereinafter, the point P11 will also be called the start point P11 or the curve start point P11, and the point P21 will also be called the end point P21 or the curve end point P21. The straight zone 212a is located before the curve zone 210a, while the straight zone 212b is located after the curve zone 210a.

In FIG. 3, curve zone information Icv, rotation assist ratio Rra, lateral acceleration Glat, and rotation assist torque Tra are shown (which are also shown in FIGS. 4 and 5). The steering wheel 20, hands 220, and arrows A1, A2, and A3 represent the steering operation by the driver. That is, the clockwise arrows A1 and A2 indicate that the driver is performing a rotating operation toward the right side. The counterclockwise arrow A3 indicates that the driver is performing a rotating operation toward the left side (or returning to the original position).

A change in the rotation assist ratio Rra when the vehicle 10 drives in the single curve zone 210a will be discussed below. The rotation assist ratio Rra starts to increase before the start point P11 of the curve zone 210a (time point t1) and is set to be 1 (maximized) before the vehicle 10 reaches the start point P11 (time point t2). This guarantees that steering assist will reliably start at the start point P11. When the vehicle 10 enters the curve zone 210a (time point t3), the driver operates the steering wheel 20 to start turning the vehicle 10. In this case, if the lateral acceleration Glat is generated in the vehicle 10, the rotation assist torque Tra is generated accordingly (time point t3). In the example in FIG. 3, the driver performs a slight steering operation (time points t1 to t3) before entering the curve zone 210a, and the rotation assist torque Tra is generated accordingly.

When the vehicle 10 is approaching the end point P21 of the curve zone 210a, the rotation assist ratio Rra starts to decrease (time point t4). Then, with the lapse of a predetermined time after the vehicle 10 passes through the end point P21 (time point t5), the rotation assist ratio Rra becomes zero and rotation assisting is finished (time point t6). In FIG. 3, the degree by which the rotation assist ratio Rra decreases is substantially the same as that by which the lateral acceleration Glat and the rotation assist torque Tra decrease. However, this is a mere coincidence.

(A-2-2-1-2. Driving in Plural Curve Zones 210b and 210c Curving in the Same Direction)

FIG. 4 illustrates an example of various items of information and data to be used in this embodiment when the vehicle 10 drives in first and second curve zones 210b and 210c that curve in the same direction. A point P12 is the start point of the first curve zone 210b and a point P22 is the end point of the first curve zone 210b. A point P13 is the start point of the second curve zone 210c and a point P23 is the end point of the second curve zone 210c. Hereinafter, the points P12 and P13 will also be called the start points P12 and P13 or the curve start points P12 and P13, and the points P22 and P23 will also be called the end points P22 and P23 or the curve end points P22 and P23.

The straight zone 212c is located before the first curve zone 210b, the straight zone 212d is located between the first and second curve zones 210b and 210c, and the straight zone 212e is located after the second curve zone 210c. The straight zone 212d is relatively short, and thus, the EPS ECU 38 handles the first and second curve zones 210b and 210c as one continuous curve zone.

A change in the rotation assist ratio Rra when the vehicle 10 drives in the first and second curve zones 210b and 210c will be discussed below. The rotation assist ratio Rra starts to increase before the start point P12 of the first curve zone 210b (time point t11) and is set to be 1 (maximized) before the vehicle 10 reaches the start point P12 (time point t12). This guarantees that steering assist will reliably start at the start point P12. When the vehicle 10 enters the first curve zone 210b (time point t13), the driver operates the steering wheel 20 to start turning the vehicle 10. In this case, if the lateral acceleration Glat is generated in the vehicle 10, the rotation assist torque Tra is generated accordingly (time point t13).

The presence of the second curve zone 210c continued from the first curve zone 210b is detected (time point t14). Then, even though the lateral acceleration Glat and the rotation assist torque Tra are decreasing as the vehicle 10 is approaching the end point P22 of the first curve zone 210b (time point t15), the rotation assist ratio Rra is maintained at 1. The rotation assist ratio Rra is maintained at 1 between the end point P22 of the first curve zone 210b (time point t16) and the start point P13 of the second curve zone 210c (time point t17).

A curve zone continuous from the second curve zone 210c is not detected. Thus, when the vehicle 10 is approaching the end point P23 of the second curve zone 210c, the rotation assist ratio Rra starts to decrease (time point t18). Then, with the lapse of a predetermined time after the vehicle 10 passes through the end point P23 (time point t19), the rotation assist ratio Rra becomes zero and rotation assisting is finished (time point t20). In the example in FIG. 4, the lateral acceleration Glat and the rotation assist torque Tra have become zero before the rotation assist ratio Rra becomes zero.

(A-2-2-1-3. Driving in Plural Curve Zones 210d and 210e Curving in Different Directions)

FIG. 5 illustrates an example of various items of information and data to be used in this embodiment when the vehicle 10 drives in first and second curve zones 210d and 210e that curve in different directions. A point P14 is the start point of the first curve zone 210d and a point P24 is the end point of the first curve zone 210d. A point P15 is the start point of the second curve zone 210e and a point P25 is the end point of the second curve zone 210e. Hereinafter, the points P14 and P15 will also be called the start points P14 and P15 or the curve start points P14 and P15, and the points P24 and P25 will also be called the end points P24 and P25 or the curve end points P24 and P25.

The straight zone 212f is located before the first curve zone 210d, the straight zone 212g is located between the first and second curve zones 210d and 210e, and the straight zone 212h is located after the second curve zone 210e. The straight zone 212g is relatively short, and thus, the EPS ECU 38 handles the first and second curve zones 210d and 210e as one continuous curve zone.

A change in the rotation assist ratio Rra when the vehicle 10 drives in the first and second curve zones 210d and 210e will be discussed below. The rotation assist ratio Rra starts to increase before the start point P14 of the first curve zone 210d (time point t31) and is set to be 1 (maximized) before the vehicle 10 reaches the start point P14 (time point t32). This guarantees that steering assist will reliably start at the start point P14. When the vehicle 10 enters the first curve zone 210d (time point t33), the driver operates the steering wheel 20 to start turning the vehicle 10. In this case, if the lateral acceleration Glat is generated in the vehicle 10, the rotation assist torque Tra is generated accordingly (time point t33).

The presence of the second curve zone 210e continued from the first curve zone 210d is detected (time point t34). Then, before the vehicle 10 approaches the end point P24 of the first curve zone 210d, the rotation assist ratio Rra starts to decrease (time point t35). Then, before the vehicle 10 reaches the end point P24 of the first curve zone 210d, the ratio Rra is set to be zero (time point t36). When the vehicle 10 passes through the end point P24 of the first curve zone 210d (time point t37), the ratio Rra is maintained at zero. Then, when the lateral acceleration Glat becomes zero (time point t38), the ratio Rra starts to increase to assist the vehicle 10 in turning in the second curve zone 210e (time point t38).

Then, when the vehicle 10 reaches the start point P15 of the second curve zone 210e, the ratio Rra is set to be 1 (maximized) (time point t39). The ratio Rra may be set to be 1 (maximized) before the vehicle 10 reaches the start point P15 of the second curve zone 210e. When the vehicle 10 enters the second curve zone 210e (time point t39), the driver operates the steering wheel 20 to start turning the vehicle 10 in the direction opposite to that in the first curve zone 210d. In this case, if the lateral acceleration Glat in the opposite direction is generated in the vehicle 10, the rotation assist torque Tra in the opposite direction is generated accordingly (time point t39).

A curve zone continuous from the second curve zone 210e is not detected. Thus, when the vehicle 10 is approaching the end point P25 of the second curve zone 210e, the rotation assist ratio Rra starts to decrease (time point t40). Then, with the lapse of a predetermined time after the vehicle 10 passes through the end point P25 (time point t41), the rotation assist ratio Rra becomes zero and rotation assisting is finished (time point t42). In the example in FIG. 5, the lateral acceleration Glat and the rotation assist torque Tra have become zero before the rotation assist ratio Rra becomes zero.

(A-2-2-2. Details of Calculation of Rotation Assist Ratio Rra)

(A-2-2-2-1. Overall Procedure for Calculating Rotation Assist Ratio Rra)

Figure 6:
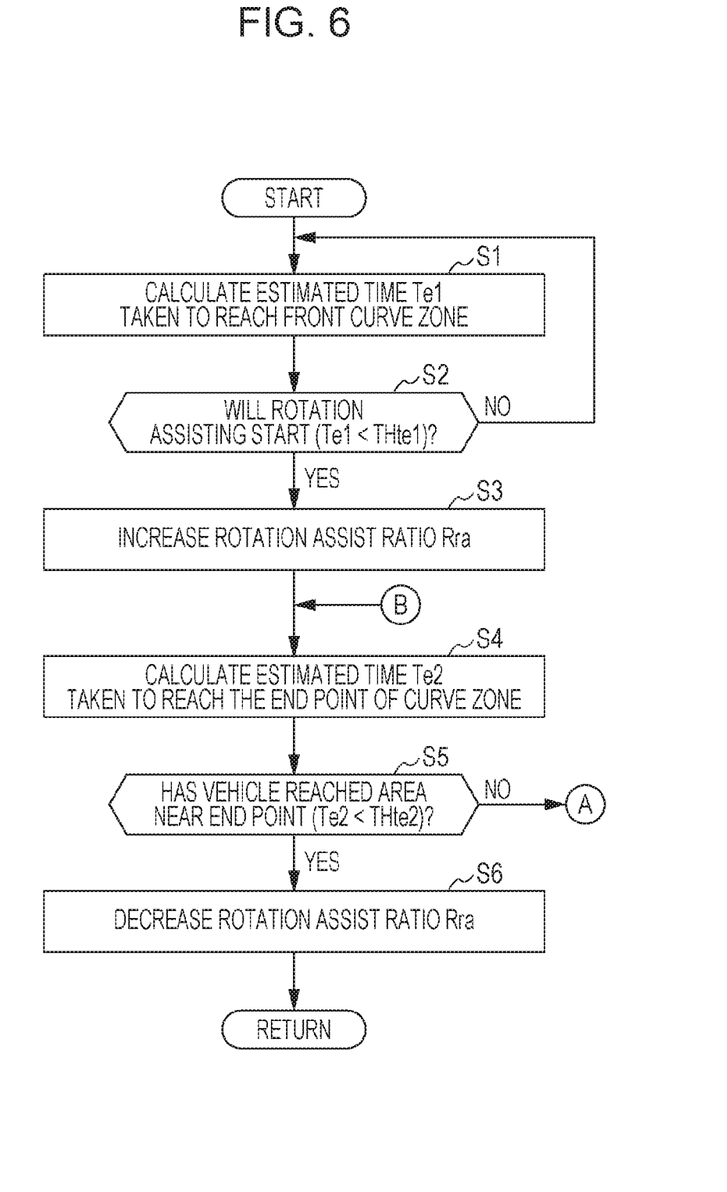
FIG. 6 is a first flowchart illustrating rotation assist ratio control for calculating a rotation assist ratio in this embodiment.
Figure 7:
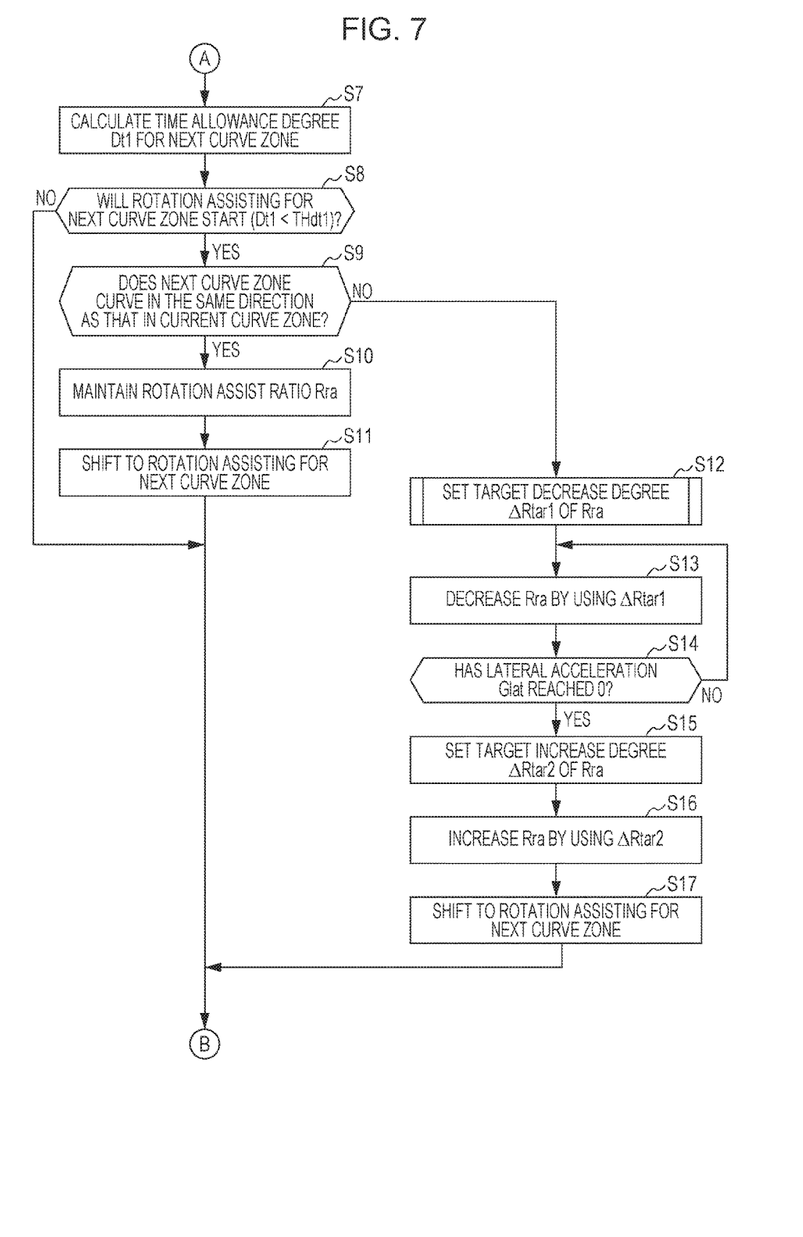
FIG. 7 is a second flowchart illustrating the rotation assist ratio control.

FIGS. 6 and 7 are first and second flowcharts illustrating rotation assist ratio control for calculating the rotation assist ratio Rra in this embodiment. In step S1, the EPS ECU 38 calculates a first estimated time Te1 (also called "estimated time Te1") taken for the vehicle 10 to reach the curve zone 210 ahead of the vehicle 10.

Rotation assist ratio control in the flowchart of FIG. 6 starts while the vehicle 10 is driving in the straight zone 212. The curve zone 210 ahead of the vehicle 10 is one of the single curve zone 210a in FIG. 3 and the first curve zones 210b and 210d in FIGS. 4 and 5. The estimated time Te1 is calculated based on the vehicle velocity Vs and the distance Lin from the vehicle 10 to a reference position Pr1 (for example, the start point P11, P12, or P14) of the curve zone 210.

In step S2, the ECU 38 determines based on the estimated time Te1 whether to start rotation assisting for the curve zone 210. If the estimated time Te1 is smaller than a first time threshold THte1, the ECU 38 determines that rotation assisting for the curve zone 210 will start, and proceeds to step S3. If the ECU 38 determines that rotation assisting for the curve zone 210 will not start (NO in step S2), it returns to step S1.

In step S3, the ECU 38 increases the rotation assist ratio Rra from 0 to 1 (t1 to t2 in FIG. 3, t11 to t12 in FIG. 4, and t31 to t32 in FIG. 5). Thereafter, the ECU 38 maintains the rotation assist ratio Rra at 1.

In step S4, the ECU 38 calculates a second estimated time Te2 (also called "estimated time Te2") taken for the vehicle 10 to reach an end point P2 (for example, the end point P21, P22, or P24) of the curve zone 210. The estimated time Te2 is calculated based on the vehicle velocity Vs and the distance Lout from the vehicle 10 to the end point P2 of the curve zone 210. Instead of the end point P2, a point around the end point P2 may be used as a reference position to calculate the estimated time Te2.

In step S5, the ECU 38 determines based on the estimated time Te2 whether the vehicle 10 has reached an area near the end point P2 of the curve zone 210, in other words, whether the distance to the end point P2 is equal to or smaller than a predetermined distance. If the estimated time Te2 is smaller than a second time threshold THte2, the ECU 38 determines that the vehicle 10 has reached an area near the end point P2 (YES in step S5). Then, in step S6, the ECU 38 decreases the rotation assist ratio Rra (t4 to t6 in FIG. 3, t18 to t20 in FIG. 4, and t40 to t42 in FIG. 5). If the ECU 38 determines that the vehicle 10 has not reached an area near the end point P2 (NO in step S5), it proceeds to step S7 in FIG. 7.

In step S7, the ECU 38 calculates a first time allowance degree Dt1 (hereinafter also called "time allowance degree Dt1", "allowance degree Dt1", or "first allowance degree Dt1") for the next curve zone 210. The next curve zone 210 is one of the second curve zones 210c and 210e in FIGS. 4 and 5. The time allowance degree Dt1 may be a value L1/Vs obtained by dividing the distance L1 from a reference position Prefv of the vehicle 10 (for example, the current position Pc of the vehicle 10) to a reference position Prefn of the next curve zone 210 (for example, the start point P13 or P15) by the vehicle velocity Vs. In this manner, the value L1/Vs obtained by dividing the distance Lin (distance L1) from the current position Pc to the start point P1 of the next curve zone 210 by the vehicle velocity Vs may be used. The value L1/Vs represents the estimated time taken for the vehicle 10 to reach the next curve zone 210. In step S7, the ECU 38 may calculate the time allowance degree Dt1 by another calculation approach, which will be discussed later.

Then, in step S8, the ECU 38 determines based on the time allowance degree Dt1 whether to start rotation assisting for the next curve zone 210. If the time allowance degree Dt1 is smaller than a first allowance degree threshold THdt1, the ECU 38 determines that rotation assisting for the next curve zone 210 will start, and proceeds to step S9. If the ECU 38 determines that rotation assisting for the next curve zone 210 will not start (NO in step S8), it returns to step S4 in FIG. 6.

In step S9, the ECU 38 determines based on the curve zone information Icv whether the next curve zone 210 curves in the same direction as that in the current curve zone 210. If the curving direction of the next curve zone 210 is found to be the same as that of the current curve zone 210 (YES in step S9), the ECU 38 executes processing shown in FIG. 4. In step S10, the ECU 38 maintains the rotation assist ratio Rra at 1 (t14 in FIG. 4). In step S11, the ECU 38 shifts to rotation assisting for the next curve zone 210. That is, the ECU 38 switches the subject of rotation assisting from the current curve zone 210 (for example, the first curve zone 210b or 210d) to the next curve zone 210 (for example, the second curve zone 210c or 210e). After step S11, the ECU 38 returns to step S4 in FIG. 6.

If the curving direction of the next curve zone 210 is found to be different from that of the current curve zone 210 (NO in step S9), the ECU 38 proceeds to step S12. In step S12, the ECU 38 sets a target decrease degree ΔRtar1 of the rotation assist ratio Rra. The target decrease degree ΔRtar1 indicates a decrease in the ratio Rra per unit time. In other words, the target decrease degree ΔRtar1 represents a gradient of the ratio Rra from t35 to t36 in FIG. 5. The specific approach to setting the target decrease degree ΔRtar1 will be discussed later with reference to FIG. 8.

In step S13, the ECU 38 decreases the ratio Rra by using the target decrease degree ΔRtar1 (t35 to t36 in FIG. 5). Then, the reaction force applied to the steering wheel 20 increases so as to instruct the driver to steer in the opposite direction.

In step S14, the ECU 38 determines whether the lateral acceleration Glat has reached zero. This allows the ratio Rra not to function until the rotating direction of the vehicle 10 coincides with that of the next curve zone 210. If the lateral acceleration Glat has not reached zero (NO in step S14), the ECU 38 returns to step S13 and decreases the ratio Rra until it reaches zero. If the lateral acceleration Glat has reached zero (t38 in FIG. 5) (YES in step S14), the ECU 38 proceeds to step S15.

In step S15, the ECU 38 sets a target increase degree ΔRtar2 of the rotation assist ratio Rra. The target increase degree ΔRtar2 indicates an increase in the ratio Rra per unit time. In other words, the target increase degree ΔRtar2 represents a gradient of the ratio Rra from t38 to t39 in FIG. 5. The specific approach to setting the target increase degree ΔRtar2 will be discussed later.

In step S16, the ECU 38 increases the ratio Rra by using the target increase degree ΔRtar2 set in step S15. In step S17, as well as in step S11, the ECU 38 shifts to rotation assisting for the next curve zone 210. After step S17, the ECU 38 returns to step S4 in FIG. 6.

(A-2-2-2-2. Setting of Target Decrease Degree ΔRtar1)

Figure 8:
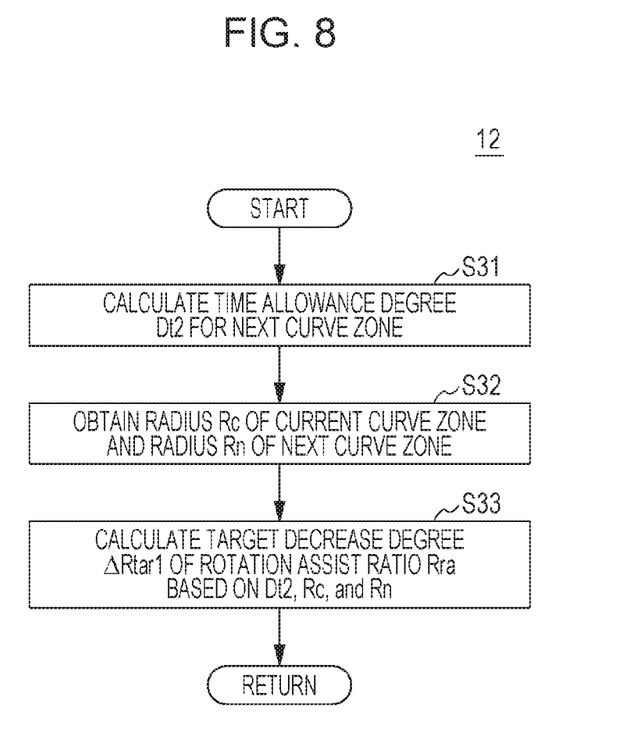
FIG. 8 is a flowchart illustrating the setting of a target decrease degree of the rotation assist ratio in this embodiment.

FIG. 8 is a flowchart (details of step S12 in FIG. 7) illustrating the setting of the target decrease degree ΔRtar1 of the rotation assist ratio Rra in this embodiment. In step S31, the ECU 38 calculates a second time allowance degree Dt2 (hereinafter also called "time allowance degree Dt2", "allowance degree Dt2", or "second allowance degree Dt2") for the next curve zone 210. The time allowance degree Dt2 may be a value L2/Vs obtained by dividing the distance L2 from a reference position Prefc of the current curve zone 210 (for example, the end point P24) to a reference position Prefn of the next curve zone 210 (for example, the start point P15) by the vehicle velocity Vs. The ECU 38 may calculate the time allowance degree Dt2 by another calculation approach, which will be discussed later. As the second time allowance degree Dt2, the same index as that of the first time allowance degree Dt1 may be used.

In step S32, the ECU 38 obtains the radius R of the current curve zone 210 (hereinafter called "radius Rc") and that of the next curve zone 210 (hereinafter called "radius Rn") from the curve zone information Icv.

In step S33, the ECU 38 calculates the target decrease degree ΔRtar1 of the rotation assist ratio Rra in accordance with the allowance degree Dt2 and the radii Rc and Rn. Specifically, the ECU 38 decreases the absolute value of the target decrease degree ΔRtar1 to be smaller as the allowance degree Dt2 is greater.

If the radius Rc of the current curve zone 210 is smaller than the radius Rn of the next curve zone 210, the ECU 38 decreases the absolute value of the target decrease degree ΔRtar1. If the radius Rc of the current curve zone 210 is much smaller than the radius Rn of the next curve zone 210, the ECU 38 may set the target decrease degree ΔRtar1 to be zero.

(A-2-2-2-3. Setting of Target Increase Degree ΔRtar2)

The target increase degree ΔRtar2 is calculated based on the second time allowance degree Dt2 for the next curve zone 210. Specifically, the ECU 38 decreases the absolute value of the target increase degree ΔRtar2 to be smaller as the allowance degree Dt2 is greater. The upper limit value may be set for the target increase degree ΔRtar2.

A-3. Advantages of Embodiment

In this embodiment, in driving in the first and second curve zones 210d and 210e that curve in different directions (FIG. 5), the time taken to finish decreasing the rotation assist ratio Rra (steering assist amount) to zero when the vehicle 10 passes through the first curve zone 210d (t35 to t36 in FIG. 5) is set to be shorter than the time when the vehicle 10 passes through the second curve zone 210e (t40 to t42 in FIG. 5). With this configuration, the rotation assist ratio Rra for the second curve zone 210e can reliably be generated when the vehicle 10 reaches the second curve zone 210e. Hence, steering assist can suitably be performed in the continuous first and second curve zones 210d and 210e that curve in different directions.

In this embodiment, if the continuous first and second curve zones 210b and 210c (FIG. 4) or the continuous first and second curve zones 210d and 210e (FIG. 5) are located in the road 200, the EPS ECU 38 (steering assist unit) increases the rotation assist torque Tra (or the rotation assist ratio Rra) (steering assist amount) as the lateral acceleration Glat of the vehicle 10 increases (FIGS. 4 and 5), regardless of whether the first and second curve zones 210b and 210c or the first and second curve zones 210d and 210e curve in the same direction or different directions.

If the continuous first and second curve zones 210b and 210c curve in the same direction (FIG. 4), the lateral acceleration Glat changes in the same direction (positive) both in the first and second curve zones 210b and 210c. If the continuous first and second curve zones 210d and 210e curve in different directions (FIG. 5), the direction (positive) in which the lateral acceleration Glat changes in the first curve zone 210d is opposite to that (negative) in the second curve zone 210e (FIG. 5). In this case, the rotation assist torque Tra (steering assist amount) is set in accordance with the lateral acceleration Glat. This makes it possible to perform steering assist by using the same basic control, regardless of whether continuous first and second curve zones curve in the same direction or different directions.

The lateral acceleration Glat is generated independently of the steering force of a driver. When the driver decreases the steering torque Tstr (steering force) while driving in one of the curve zones 210b through 210e, self-aligning torque may be generated in the front wheels 96. Even in this case, the rotation assist ratio Rra is set in accordance with the lateral acceleration Glat. This makes it more likely to maintain the steering state when the driver decreases the steering torque Tstr (steering force), thereby enhancing the driving stability.

In this embodiment, if the curve zone information Icv (road information) indicates that the continuous first and second curve zones 210d and 210e that curve in different directions are located in the road 200 (NO in step S9 in FIG. 7), the EPS ECU 38 (steering assist unit) decreases the rotation assist ratio Rra (steering assist amount) to zero in an area before the end point of the first curve zone 210d even with the generation of the lateral acceleration Glat (t36 in FIG. 5). This makes it possible to perform steering assist by taking the second curve zone 210e into account while maintaining basic control in which the ratio Rra is set in accordance with the lateral acceleration Glat.

In this embodiment, the curve zone information Icv (road information) indicates that the straight zone 212d is located between the first and second curve zones 210b and 210c and the straight zone 212g is located between the first and second curve zones 210d and 210e. If the first time allowance degree Dt1 becomes smaller than the first allowance degree threshold THdt1 (YES in step S8 in FIG. 7), the EPS ECU 38 (steering assist unit) determines that the first and second curve zones 210b and 210c are continuous and the first and second curve zones 210d and 210e are continuous.

Even with the presence of the straight zone 212d between the first and second curve zones 210b and 210c and the straight zone 212g between the first and second curve zones 210d and 210e, it is possible to adjust the rotation assist ratio Rra (steering assist amount) in the first curve zones 210b and 210d by taking the second curve zones 210c and 210e into account (t14 to t17 in FIG. 4, t34 to t39 in FIG. 5).

In this embodiment, the EPS ECU 38 (steering assist unit) decreases the target decrease degree ΔRtar1 (a decrease in the rotation assist ratio Rra per unit time) to be smaller as the second time allowance degree Dt2 is greater (step S33 in FIG. 8). If the second time allowance degree Dt2 for the second curve zone 210e is relatively high, the ratio Rra in the first curve zone 210d is decreased moderately. This makes it more likely to improve the steering assist performance in the first curve zone 210d while suitably performing steering assist in the second curve zone 210e.

In this embodiment, if the curve zone information Icv (road information) indicates that the continuous first and second curve zones 210d and 210e that curve in different directions are located in the road 200 (NO in step S9 in FIG. 7), the EPS ECU 38 (steering assist unit) compares the radius R of the first curve zone 210d with that of the second curve zone 210e. If the radius R of the first curve zone 210d is smaller than that of the second curve zone 210e (if the curvature of the first curve zone 210d is greater than that of the second curve zone 210e), the EPS ECU 38 decreases the target decrease degree ΔRtar1 (a decrease in the ratio Rra per unit time) to be smaller than that if the radius R of the second curve zone 210e is smaller than that of the first curve zone 210d (step S33 in FIG. 8).

This arrangement makes it possible to enhance the driving stability in the first curve zone 210d which curves more sharply than the second curve zone 210e.

B. Modified Examples

The present disclosure is not restricted to the above-described embodiment, and various modifications may be made based on the description of the embodiment. For example, the following configurations may be employed.

B-1. Subject to be Mounted on Vehicle

In the above-described embodiment, the EPS device 16 (steering assist device) is mounted on the vehicle 10 (FIG. 1). In terms of assisting steering of the steering wheel 20, however, the subject to be mounted on the vehicle 10 is not restricted to the EPS device 16. The present disclosure may be applicable to a mobile body or a movable device including the steering wheel 20 (or an operator).

B-2. GPS Antenna 12 and Map Information Providing Device 14 (Environment Information Obtaining Unit)

The above-described embodiment has been discussed, assuming that the GPS antenna 12 and the map information providing device 14 are mounted on the vehicle 10 (FIG. 1). However, the GPS antenna 12 and the map information providing device 14 may be partially or entirely disposed in a mobile terminal, and this mobile terminal may be connected to a network of the vehicle 10.

In the above-described embodiment, the EPS ECU 38 obtains map information Imap or the curve zone information Icv from the map information providing device 14 (FIG. 1). In terms of obtaining the map information Im or the curve zone information Icv, however, the EPS ECU 38 may obtain such information from another element. For example, a front camera which captures an image of the front area of the vehicle 10 may be disposed in the vehicle 10. Then, the EPS ECU 38 may detect the presence of a curve zone 210 based on an image captured by this front camera. Alternatively, another ECU may detect the presence of a curve zone 210. Alternatively, the map information Imap obtained from the map information providing device 14 may be corrected based on an image captured by the front camera.

B-3. EPS Device 16

[B-3-1. Overall Configuration of EPS Device 16]

The EPS device 16 in the above-described embodiment is a column assist EPS device in which the EPS motor 28 transmits motor torque Tm to the steering shaft 52. However, any type of EPS device 16 that generates motor torque Tm may be used. The EPS device 16 may be a pinion assist, dual pinion assist, rack assist, or electro-hydraulic power steering device. In the electro-hydraulic power steering device, hydraulic pressure is created by an electric pump to generate motor torque Tm.

In the above-described embodiment, the direct transmit system is employed in which steering torque generated by the driver is directly transmitted to the front wheels 96. The present disclosure may be applicable to a steer-by-wire EPS device.

[B-3-2. EPS Motor 28]

In the above-described embodiment, the EPS motor 28 is a three-phase AC brushless motor. The EPS motor 28 may be another type of motor, such as a three-phase AC brush, single-phase AC, or DC motor.

In the above-described embodiment, the EPS motor 28 receives power from the low voltage battery 40 (FIG. 1). In addition to or instead of the low voltage battery 40, an alternator, a fuel cell, or a high voltage battery may supply power to the EPS motor 28.

[B-3-3. EPS ECU 38]

The above-described embodiment has been discussed, assuming that the EPS ECU 38 is mounted on the vehicle 10 (FIG. 1). However, part of the EPS ECU 38 may be disposed in a mobile terminal, and this mobile terminal may be connected to a network of the vehicle 10.

B-4. Steering Assist Control

[B-4-1. Rotation Assist Torque Tra (Steering Assist Torque)]

In steering assist control in the above-described embodiment, as the steering assist torque Tasi, a drive force (torque) in the same direction as the steering torque Tstr of the driver is generated. In terms of assisting a driver in steering using the steering wheel 20, however, a force acting in the direction opposite to the steering torque Tstr (for example, a reaction force) may be generated.

"Assisting a driver in steering using the steering wheel 20" refers to the following two cases if the direct transmit system is employed in which the EPS device 16 directly transmits the steering torque Tstr to the front wheels 96. In one case, assisting a driver in steering using the steering wheel 20 makes it easy for the driver to rotate the steering wheel 20 in a direction intended by the driver (such as the configuration in the above-described embodiment). In the other case, assisting a driver in steering using the steering wheel 20 makes it difficult for the driver to rotate the steering wheel 20 in a direction intended by the driver.

[B-4-2. Rotation Assist Ratio Control (FIG. 6 Through 8)]

(B-4-2-1. Rotation Assist Ratio Rra (Steering Assist Amount))

In the above-described embodiment, in the continuous first and second curve zones 210d and 210e that curve in different directions, in an area right before the second curve zone 210e, the rotation assist ratio Rra is decreased regardless of the value of the lateral acceleration Glat (t35 to t36 in FIG. 5, steps S12 and S13 in FIG. 7, steps S31 through S33 in FIG. 8). However, in terms of preparing for rotation assisting for the second curve zone 210*e*, the rotation assist ratio Rra may be decreased in a different manner. For example, the degree of a decrease in the rotation assist ratio Rra (steering assist amount) in relation to the degree of a decrease in the lateral acceleration Glat in an area right before the second curve zone 210*e* may be set to be greater than that in the other areas in the first curve zone 210*d*.

In the above-described embodiment, in the continuous first and second curve zones 210*d* and 210*e* that curve in different directions, the rotation assist ratio Rra is decreased (t36 in FIG. 5, step S13 in FIG. 7). However, the rotation assist ratio Rra may be decreased in a different manner. For example, the lateral acceleration torque Tg may be directly decreased by changing the map 170.

In the above-described embodiment, in the continuous first and second curve zones 210*d* and 210*e* that curve in different directions, the rotation assist ratio Rra is decreased to zero (t36 in FIG. 5, step S13 in FIG. 7). However, the rotation assist ratio Rra may not be decreased to zero if the time taken to finish decreasing the rotation assist ratio Rra in the first curve zone 210*d* is shorter than that in the second curve zone 210*e*.

(B-4-2-2. First and Second Allowance Degrees Dt1 and Dt2)

In the above-described embodiment, as the first time allowance degree Dt1 for determining the presence of the next curve zone 210*c* or 210*e* in the continuous curve zones 210*b* and 210*c* or 210*d* and 210*e*, the value L1/Vs obtained by dividing the distance L1 from the reference position Prefv of the vehicle 10 (for example, the current position Pc of the vehicle 10) to the reference position Prefn of the next curve zone 210 (for example, the start points P13 and P15 of the second curve zones 210*c* and 210*e*) by the vehicle velocity Vs is calculated (step S7 in FIG. 7). Alternatively, as the first time allowance degree Dt1, a value L3/Vs obtained by dividing a distance L3 from the reference position Prefc of the current curve zone 210 (for example, the end points P22 and P24 of the second curve zones 210*b* and 210*d*) to the reference position Prefn of the next curve zone 210 (for example, the start points P13 and P15 of the second curve zones 210*c* and 210*e*) by the vehicle velocity Vs may be calculated. The second time allowance degree Dt2 may also be calculated in a similar manner.

In the above-described embodiment, the time allowance degree Dt1 is used as an allowance for determining the presence of the next curve zone 210*c* or 210*e* in the continuous curve zones 210*b* and 210*c* or 210*d* and 210*e* (step S8 in FIG. 7). However, the presence of the next curve zone may be determined by using another factor, such as a distance allowance degree. As the distance allowance degree, for example, the distance from the end points P22 and P24 of the first curve zones 210*b* and 210*d* to the start points P13 and P15 of the second curve zones 210*c* and 210*e* may be used.

(B-4-2-3. Curve Radius R (Curvature Degree))

In steering assist control in the above-described embodiment, the curve radius R (Rc and Rn) is used. However, in terms of reflecting the curvature of the curve zone 210, the radius of curvature of the curve zone 210 may be used. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A steering assist device comprising:
    an environment information obtaining unit that obtains environment information concerning environments in a traveling direction of a subject vehicle; and
    a steering assist controller that assists the subject vehicle in steering with a steering assist amount, by using the environment information obtained by the environment information obtaining unit,
    the environment information obtaining unit including
        a road information obtaining unit that obtains road information including a position and a configuration of a road in a route of the subject vehicle,
    wherein, if the road information indicates that:
        (i) there are, on the route, a first curve zone and a second curve zone following the first curve zone, the first curve zone and the second curve zone being continuously located, and
        (ii) the first curve zone and the second curve zone curve in different directions from each other,
    the steering assist controller starts a first decreasing process of decreasing the steering assist amount before the subject vehicle reaches an end of the first curve zone and starts a second decreasing process of decreasing the steering assist amount before the subject vehicle reaches an end of the second curve zone, and
    the steering assist controller finishes the first decreasing process of decreasing the steering assist amount when the subject vehicle passes through the first curve zone earlier than a case when the subject vehicle passes through the second curve zone.

2. The steering assist device according to claim 1, wherein, if the road information indicates that:
    (i) there are, on the route, the first curve zone and the second curve zone following the first curve zone, the first curve zone and the second curve zone being continuously located,
    the steering assist controller increases the steering assist amount as a lateral acceleration of the subject vehicle increases, regardless of whether the first and second curve zones curve in the same direction or different directions from each other.

3. The steering assist device according to claim 2, wherein, if the road information indicates that:
    (i) there are, on the route, the first curve zone and the second curve zone following the first curve zone, the first curve zone and the second curve zone being continuously located, and
    (ii) the first curve zone and the second curve zone curve in different directions from each other,
    the steering assist controller decreases the steering assist amount to zero when the subject vehicle reaches an area before and close to an end point of the first curve zone even if the lateral acceleration is generated.

4. The steering assist device according to claim 1, wherein, when the road information indicates that a straight zone is located between the first and second curve zones,
    the steering assist controller determines that the first and second curve zones are continuous if a time or distance first allowance degree is smaller than a first allowance degree threshold, the time or distance first allowance degree representing an allowance in terms of a time or a distance from a first reference position of the first curve zone or the subject vehicle to a second reference position of the second curve zone.

5. The steering assist device according to claim 1, wherein, as a time or distance second allowance degree becomes greater, the steering assist controller reduces a decrease amount of the steering assist amount per unit time to be smaller, the time or distance second allowance degree representing an allowance in terms of a time or a distance from a third reference position of the first curve zone or the subject vehicle to a fourth reference position of the second curve zone.

6. The steering assist device according to claim 1, wherein, if the road information indicates that:
   (i) there are, on the route, the first curve zone and the second curve zone following the first curve zone, the first curve zone and the second curve zone being continuously located, and
   (ii) the first curve zone and the second curve zone curve in different directions from each other,
   the steering assist controller reduces a decrease amount of the steering assist amount per unit time to be smaller when a curvature degree of the first curve zone is greater than a curvature degree of the second curve zone compared with a case when the curvature degree of the second curve zone is greater than the curvature degree of the first curve zone.

7. The steering assist device according to claim 1, wherein the steering assist controller sets a time taken to finish the decreasing process when the subject vehicle passes through the first curve zone shorter than a time set to be taken to finish the decreasing process when the subject vehicle passes through the second curve zone.

8. The steering assist device according to claim 1, wherein the steering assist controller finishes the first decreasing process when the subject vehicle passes through the first curve zone before the subject vehicle reaches the end of the first curve zone, and
   the steering assist controller finishes the second decreasing process when the subject vehicle passes through the second curve zone after the subject vehicle reaches the end of the second curve zone.

9. A steering assist circuit for assisting a subject vehicle in steering, based on road information including a position and a configuration of a road in a route of the subject vehicle, wherein:
   the steering assist circuit increases or decreases a steering assist amount in accordance with an increase or a decrease in a lateral acceleration of the subject vehicle; and
   if the road information indicates that:
   (i) there are, on the route, a first curve zone and a second curve zone following the first curve zone, the first curve zone and the second curve zone being continuously located, and
   (ii) the first curve zone and the second curve zone curve in different directions from each other,
   the steering assist circuit decreases the steering assist amount when the subject vehicle reaches an area before and close to an end point of the first curve zone regardless of a degree of a decrease in the lateral acceleration, or
   the steering assist circuit increases a degree of a decrease in the steering assist amount in relation to the degree of a decrease in the lateral acceleration when the subject vehicle travels in the area before and close to the end point of the first curve zone compared with a case when the subject vehicle travels in an area before and close to an end point of the second curve zone.

10. A steering assist method comprising steps of:
(1) obtaining, by a computer, environment information concerning environments in a traveling direction of a subject vehicle; and
(2) assisting, by the computer, the subject vehicle in steering with a steering assist amount, by using the obtained environment information,
   wherein the step (1) obtains road information including a position and a configuration of a road in a route of the subject vehicle,
wherein, if the road information indicates that:
   (i) there are, on the route, a first curve zone and a second curve zone following the first curve zone, the first curve zone and the second curve zone being continuously located, and
   (ii) the first curve zone and the second curve zone curve in different directions from each other,
      the step (2) starts a first decreasing process of decreasing the steering assist amount before the subject vehicle reaches an end of the first curve zone and starts a second decreasing process of decreasing the steering assist amount before the subject vehicle reaches an end of the second curve zone, and finishes the first decreasing process of decreasing the steering assist amount when the subject vehicle passes through the first curve zone earlier than a case when the subject vehicle passes through the second curve zone.

* * * * *